Jan. 26, 1932. E. E. DAVIDSON 1,842,586
CHANNELED STRIP MATERIAL AND METHOD OF MAKING THE SAME
Filed May 4, 1929
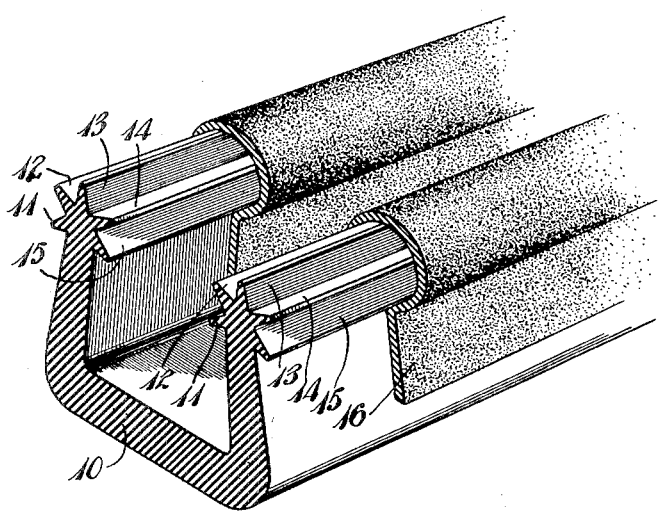
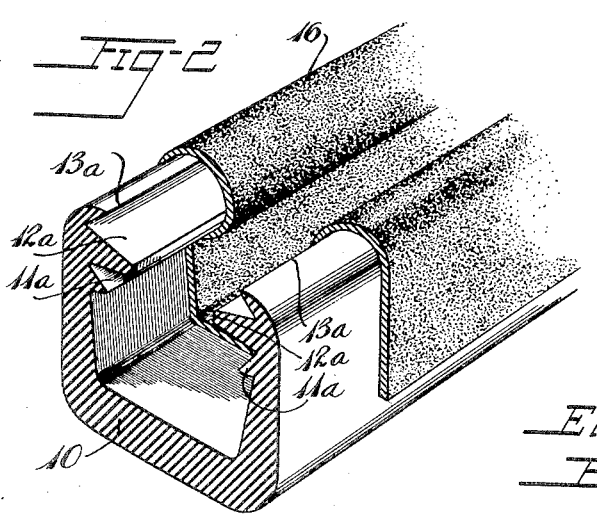
Inventor
Elias E. Davidson
By Eakin & Avery
Attys.

Patented Jan. 26, 1932

1,842,586

UNITED STATES PATENT OFFICE

ELIAS E. DAVIDSON, OF AKRON, OHIO, ASSIGNOR TO THE B. F. GOODRICH COMPANY, OF NEW YORK, N. Y., A CORPORATION OF NEW YORK

CHANNELED STRIP MATERIAL AND METHOD OF MAKING THE SAME

Application filed May 4, 1929. Serial No. 360,542.

This invention relates to channeled strip material such as is used to guide and cushion the margins of window panes in automobiles and to methods of making the same and its chief objects are to provide economy in the manufacture of such material; to provide desirable cushioning properties; and to provide a channel strip adapted to be used with glasses of different thicknesses throughout a wide range with a desirable gripping of the glass by the side-walls of the channel strip.

Of the accompanying drawings:

Fig. 1 is a perspective view of a channel strip embodying and made in accordance with my invention in its preferred form.

Fig. 2 is a similar view of a modification.

Referring to the drawings, the channel strip of Fig. 1 comprises a rubber body 10 of U-shape in cross-section, the outer margin of each of its side-walls being integrally formed with a plurality of longitudinal ribs 11, 12, 13, 14, 15 radiating like the points of a star from a common axis at about the middle plane of the side-wall.

The rubber body 10 is conveniently and economically formed by means of an extruding machine and is vulcanized in open steam or air, or permissibly it may be given a mold cure.

The rubber body is then provided with a fibrous cover 16, preferably of felt, by folding the cover about the rubber body as shown and cementing it thereto, the cover strip bridging the spaces between the ribs so that it presents a substantially cylindrical exterior surface and provides a hollow bead along the margin of each side-wall of the strip, the deformability of the comparatively thin ribs giving the composite bead a wide range of adaptability as to glasses of different thicknesses and providing desirable cushioning properties.

In the modification shown in Fig. 2 each of the side walls is formed with only three ribs, 11ª, 12ª, 13ª, on the inner face of the wall, so that an internal bead only is provided.

In either case, a channel strip having the desirable characteristics set out above is economically provided.

I claim:

1. Channeled strip material comprising a U-shaped rubber body formed with a plurality of ribs integral with each of its sidewalls and a cover bridging the spaces between the ribs and secured to the rubber body.

2. Channeled strip material comprising a U-shaped rubber body integrally formed with a plurality of longitudinal ribs radiating from approximately a common axis at the outer margin of each of its side-walls and a cover extending about the ribs and bridging the spaces between them to provide a hollow bead.

3. The method of making channeled strip material which comprises forming a U-shaped rubber body with a plurality of ribs integral with each of its side-walls and placing a cover about the ribs so that it bridges the spaces between them and securing the cover to the body.

4. The method of making channeled strip material which comprises forming by extrusion a U-shaped rubber body having a plurality of ribs integral with each of its sidewalls, vulcanizing the body and thereafter securing a cover thereon with the cover bridging the spaces between the ribs.

In witness whereof I have hereunto set my hand this 26th day of April, 1929.

ELIAS E. DAVIDSON.